United States Patent Office 2,839,101
Patented June 17, 1958

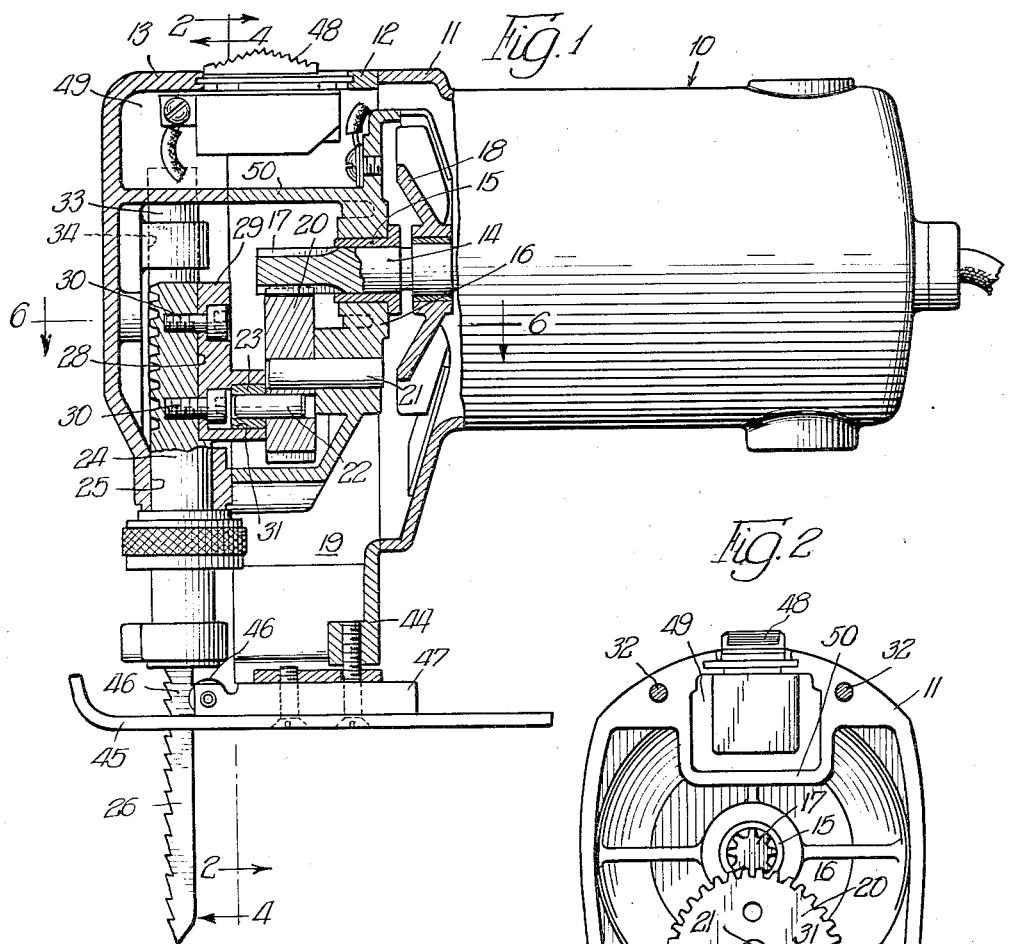
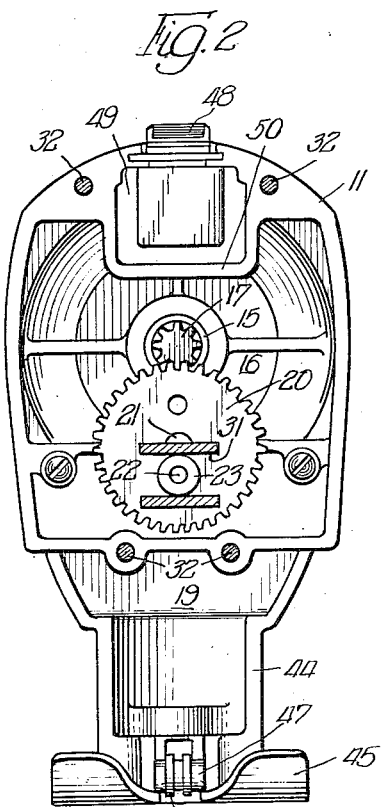
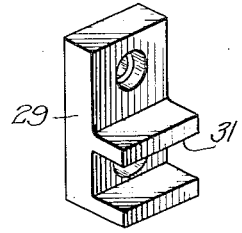
Fig. 1
Fig. 2
Fig. 3
INVENTOR.
Hugo W. Bork,
BY
Cromwell, Greist & Warden
Attys

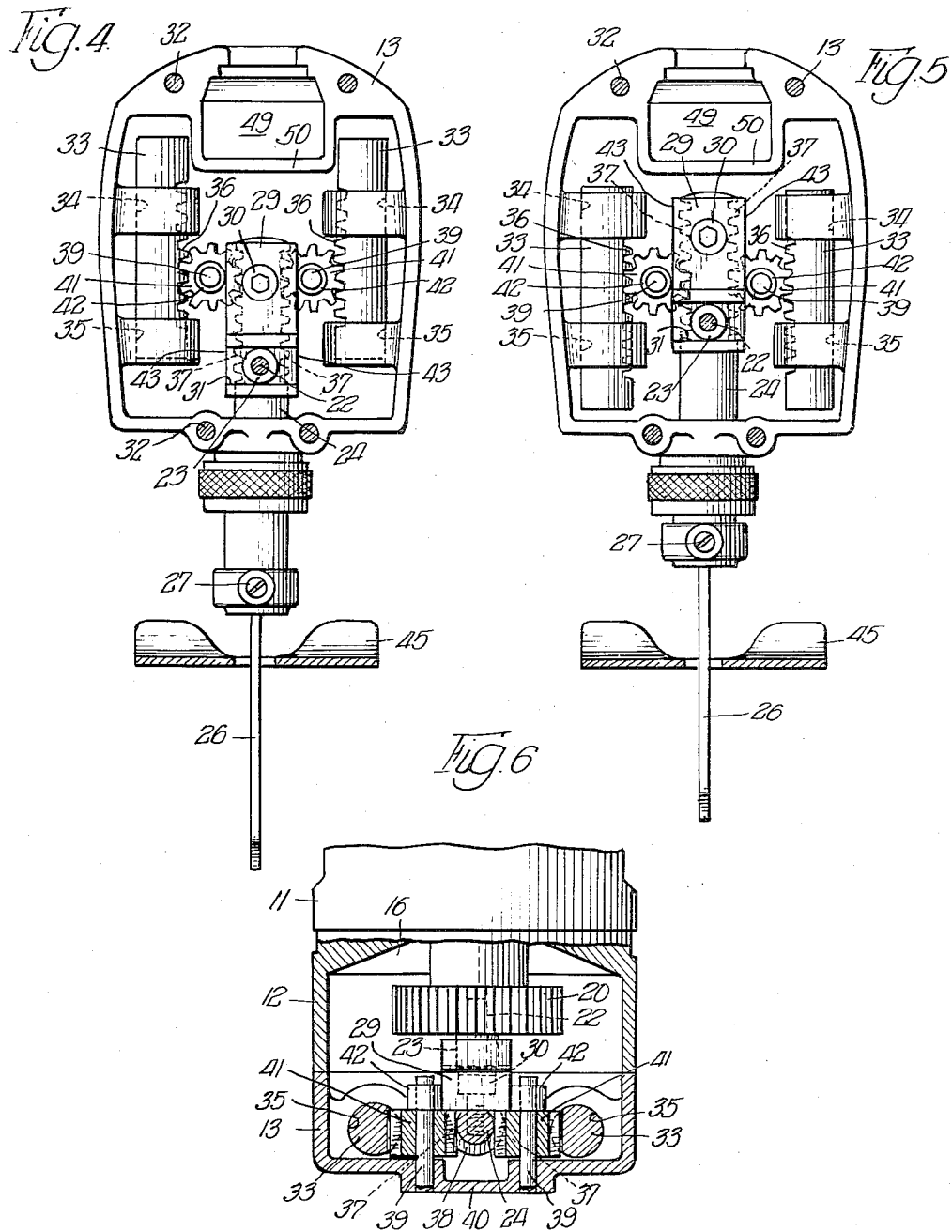

2,839,101

PORTABLE POWER-DRIVEN RECIPROCATING SAW

Hugo W. Bork, Chicago, Ill., assignor to Skil Corporation, Chicago, Ill., a corporation of Delaware Application February 7, 1956, Serial No. 563,993

5 Claims. (Cl. 143—68)

This invention has to do with power-driven reciprocating saws of the type which are adapted to be supported in the hand of the operator while in use.

In saws of this type the mechanism for reciprocating the blade tends to create considerable vibration because of the speed at which the blade reciprocates, with the result that attempts have heretofore been made to incorporate means for counteracting the vibration to a point where the saw can be held steady and maintained in correct position relative to the work while being operated. But the vibration counteracting means which have heretofore been proposed for this purpose have been complicated, expensive and of questionable efficacy.

The purpose of the present invention is to provide, in a saw of this type, new and improved vibration counteracting means which is effective for the purpose intended and yet is quite simple in construction, practically frictionless and noiseless in operation, and easy to take apart and put together for cleaning or repair.

While the foregoing statements are indicative in a general way of the nature of the invention, other objects and advantages will be apparent to those skilled in the art upon a full understanding of the construction, arrangement and operation of the parts comprising the new vibration counteracting means.

A preferred embodiment of the invention is presented herein for the purpose of exemplification but it will of course be appreciated that the invention is susceptible of incorporation in other structurally modified forms coming equally within the scope of the appended claims.

In the accompanying drawings,

Fig. 1 is a partially sectioned side view of a saw which incorporates the vibration counteracting means of the invention;

Fig. 2 is a vertical section through the saw, taken at the line of separation of the removable front section of the casing;

Fig. 3 is a perspective view of the cross-head block which is secured to the reciprocating bar which carries the saw blade;

Fig. 4 is another vertical section through the saw, taken at the line of separation of the removable front section of the casing, viewed in the opposite direction from Fig. 2, showing the blade-holding bar in its lowermost position;

Fig. 5 is a similar section, showing the blade-holding bar in its uppermost position; and Fig. 6 is a horizontal section through the front portion of the saw, taken on approximately the line 6—6 of Fig. 1.

As will be observed in the drawings, the tool includes a casing 10, which casing is preferably of sectional construction and consists of a rear section 11, an intermediate section 12, and a readily detachable front section 13. An electric motor (not shown) is mounted in the rear section 11 of the casing, which section is of such size and shape as to form a convenient hand grip.

The front end of the shaft 14 of the motor is journaled in a bearing 15 which is provided for the same in a vertical partition 16 in the intermediate section 12 of the casing, and terminates in a small forwardly projecting drive pinion 17. Behind the partition 16 the shaft 14 of the motor is equipped with a fan 18, which fan serves to draw a current of air forwardly through the rear section of the casing, whereby to cool the motor, and which also serves to direct the current of air downwardly and forwardly through a passageway 19 in the lower portion of the intermediate section 12, whereby to blow sawdust away from the hereinafter described cutting blade.

A reduction gear 20 is journaled on a stub shaft 21 which is secured in the partition 16 directly beneath the drive pinion 17 and meshes with the latter. The gear 20 is provided eccentrically of the same with a crank shaft 22, which shaft projects forwardly from the front face of the gear 20 and provides a journal for a cross-head roller 23. The detachable front section 13 of the casing contains a vertical bar 24 which is slidably mounted for vertical reciprocation in a bearing 25 located at the center of the bottom of the front section 13. The lower end of the bar 24 extends downwardly below the bottom of the front section 13 and constitutes a holder for a saw blade 26, which blade is detachably secured in the lower end of the bar 24 by a set screw 27 or other suitable means.

The bar 24 is preferably round in cross section and is provided near its upper end with a flat rearwardly facing surface to which a cross-head block 29 is attached by screws 30. The block 29 is provided with a horizontally disposed rearwardly facing slot 31, and when the detachable front section 13 of the casing is secured in position against the intermediate section 12, which securement is effected by four screws 32, the cross-head roller 23 on the reduction gear 20 is positioned in the slot 31 in the block.

With this arrangement, rotation of the drive pinion 17 will of course act through the reduction gear 20, the cross-head roller 23 and the slot 31 in the cross-head block 29 to reciprocate the bar 24 and consequently the saw blade 26, all in a manner well known in the art.

A pair of vertical rods 33, which like the bar 24 are preferably of round cross section, are mounted in the front section 13 of the casing, in closely spaced parallel relation to the bar 24, and at opposite sides of the latter, and are journaled adjacent their upper and lower ends for vertical reciprocation in upper and lower bearings 34 and 35 formed in the section 13. The rods 33 are provided on the faces of the same which confront the bar 24 with flat teeth 36. The sides of the bar 24 which confront the rods 33 are provided with corresponding teeth 37, which teeth may advantageously be of round formation, extending continuously about the entire circumference of the bar 24 as shown at 38 in Fig. 6 and being interrupted only by the flat rear surface 28 of the bar to which the cross-head block 29 is flatly secured.

The rods 33 are compactly associated with the bar 24 and preferably spaced from the bar a distance which only approximates the thickness of the bar. In the narrow spaces present between the rods 33 and the bar 24 two rearwardly projecting stub shafts 39 are positioned, which stub shafts are fixed in the front wall 40 of the front section 13. These stub shafts 39 are located between the upper and lower bearings 34 and 35 in which the rods 33 reciprocate and have journaled thereon small oscillating idler pinions 41, which pinions mesh with the teeth on the bar and the teeth on the rods. The stroke of the bar 24, as determined by the eccentricity of the roller 23 with respect to the gear 20, is preferably such as to cause the idler pinions 41 to oscillate only about a half turn or less in each direction. This stroke can be changed, if desired, by transferring the crank shaft 22 to an alternative hole provided for the same in the gear 20. The stub shafts 39 on which the pinions 41 are journaled project rearwardly beyond the pinions and have journaled thereon guide rollers 42 which bear against flat vertical guideways 43 provided on the side edges of the cross-head block 29.

As a result of this arrangement, the rods 33 are prevented from turning by reason of their engagement with the pinions 41 and the bar 24 is at the same time prevented from turning by reason of the engagement of the guideways 43 on the sides of the cross-head block 29 with the guide rollers 42 which are mounted on the ends of the stub shafts 39 which carry the pinions 41.

The combined mass of the rods 33 approximates the combined mass of the bar 24, the cross-head block 29 and the blade 26, with the result that the vibration which the rapid operation of the tool would otherwise set up is effectively counteracted by the reciprocating movement of the rods 33 and friction between parts in the operation of the mechanism is almost completely eliminated by the free way in which the parts are mounted and in which they guidingly support and cooperate with each other.

Because of the construction above described the saw and the vibration counteracting mechanism incorporated in the same are quite inexpensive to manufacture, are easy to assemble, and do not require the precision of workmanship which vibration counteracting mechanisms of other types have heretofore required.

The casing is provided, rearwardly of the detachable front section 13, with a downwardly extending forwardly opening portion 44 to which the usual bifurcated foot 45 is attached, with the saw blade 26 disposed in the bifurcation. A grooved roller 46 is also preferably provided in a bracket 47 on the foot, behind the blade, for absorbing the rearward thrust imposed on the blade during the cutting operation. The switch 48 for the motor may be located in any readily accessible position, but is preferably positioned in a pocket 49 which is formed in the upper part of the front portion of the casing by a U-shaped partition 50.

I claim:

1. In a portable power-driven reciprocating saw of the type characterized by a casing, an electric motor mounted in the casing, a drive pinion on the motor, a reduction gear journaled in the casing in mesh with the drive pinion, a vertical saw-blade holding bar slidably mounted for vertical reciprocation in a bearing in the casing, and a power transmitting connection between the motor and the bar for converting the rotary movement of the motor into a reciprocatory movement of the bar; the provision of vibration counteracting means comprising a pair of vertical rods which are positioned in the casing at opposite sides of the bar and are slidably mounted for vertical reciprocation in bearings in the casing, the opposite sides of the bar and the confronting sides of the rods being provided with teeth, and a pair of idler pinions which are journaled for oscillatory movement in the casing at opposite sides of the bar, between the bar and the rods, in mesh with both the teeth on the bar and the teeth on the rods, for causing the rods to be reciprocated by the bar in opposition to the latter.

2. In a portable power-driven reciprocating saw of the type characterized by a casing, an electric motor mounted in the casing, a drive pinion on the motor, a reduction gear journaled in the casing in mesh with the drive pinion, a vertical saw-blade holding bar slidably mounted for vertical reciprocation in a bearing adjacent the bottom of the casing, a cross-head block attached to the bar, and a follower in the cross-head eccentrically journaled on the reduction gear; the provision of vibration counteracting means comprising a pair of vertical rods which are positioned in the casing at opposite sides of the bar and are slidably mounted for vertical reciprocation adjacent their upper and lower ends in upper and lower bearings in the casing, the opposite sides of the saw-blade holding bar and the confronting sides of the rods being provided with teeth, and a pair of idler pinions which are journaled for oscillatory movement in the casing at opposite sides of the bar, between the upper and lower bearings for the rods, in mesh with both the teeth on the bar and the teeth on the rods, for causing the rods to be reciprocated by the bar in opposition to the latter.

3. In a portable power-driven reciprocating saw of the type characterized by a casing, an electric motor mounted in the casing, a drive pinion on the motor, a reduction gear journaled in the casing in mesh with the drive pinion, a vertical saw-blade holding bar slidably mounted for vertical reciprocation in a bearing adjacent the bottom of the casing, a cross-head block attached to the bar, and a follower in the cross-head eccentrically journaled on the reduction gear; the provision of vibration counteracting means comprising a pair of vertical rods which are positioned in the casing at opposite sides of the bar and are slidably mounted for vertical reciprocation in bearings in the casing, the opposite sides of the bar and the confronting sides of the rods being provided with teeth, a pair of idler pinions which are journaled for oscillatory movement in the casing at opposite sides of the bar, between the bar and the rods, in mesh with both the teeth on the bar and the teeth on the rods, for causing the rods to be reciprocated by the bar in opposition to the latter, and means for preventing the bar from turning in its bearing, said means comprising vertical guideways provided on opposite sides of the cross-head member, and rollers concentrically associated with the idler pinions, which rollers engage with said guideways.

4. In a portable power-driven reciprocating saw of the type characterized by a casing, an electric motor mounted in the casing, a drive pinion on the motor, a reduction gear journaled in the casing in mesh with the drive pinion, a vertical saw-blade holding bar slidably mounted for vertical reciprocation in a bearing adjacent the bottom of the casing, a cross-head block attached to the bar, and a follower in the cross-head eccentrically journaled on the reduction gear; the provision of vibration counteracting means comprising a pair of vertical rods which are positioned in the casing at opposite sides of the bar and are slidably mounted for vertical reciprocation in bearings in the casing, the opposite sides of the bar and the confronting sides of the rods being provided with teeth, and a pair of idler pinions which are journaled for oscillatory movement in the casing at opposite sides of the bar, between the bar and the rods, in mesh with both the teeth on the bar and the teeth on the rods, for causing the rods to be reciprocated by the bar in opposition to the latter, said casing being provided with a detachable front section, and said vibration counteracting means being mounted in its entirety in the detachable front section, independently of the rear section, and being removable as a unit with the front section.

5. In a portable power-driven reciprocating saw of the type characterized by a casing, an electric motor mounted in the casing, a drive pinion on the motor, a reduction gear journaled in the casing in mesh with the drive pinion, a vertical saw-blade holding bar slidably mounted for vertical reciprocation in a bearing adjacent the bottom of the casing, a cross-head block attached to the bar, and a follower in the cross-head eccentrically journaled on the reduction gear; the provision of vibration counteracting means comprising a pair of vertical rods which are positioned in the casing at opposite sides of the bar and are slidably mounted for vertical reciprocation in bearings in the casing, the opposite sides of the bar and the confronting sides of the rods being provided with teeth, and a pair of idler pinions which are journaled for oscillatory movement in the casing at opposite sides of the bar, between the bar and the rods, in mesh with both the teeth on the bar and the teeth on the rods, for causing the rods to be reciprocated by the bar in opposition to the latter, said rods being of approximately the same thickness as the bar, and the spacing between the rods and the bar being approximately the same as the thickness of the rods.

References Cited in the file of this patent

UNITED STATES PATENTS

| | | |
|---|---|---|
| 1,150,153 | Strauss | Aug. 17, 1915 |
| 2,501,631 | Oschwald | Mar. 21, 1950 |
| 2,506,736 | Oschwald | May 9, 1950 |
| 2,639,737 | Forsberg | May 26, 1953 |
| 2,699,745 | Ayres | Jan. 18, 1955 |
| 2,704,941 | Holford | Mar. 29, 1955 |